UNITED STATES PATENT OFFICE.

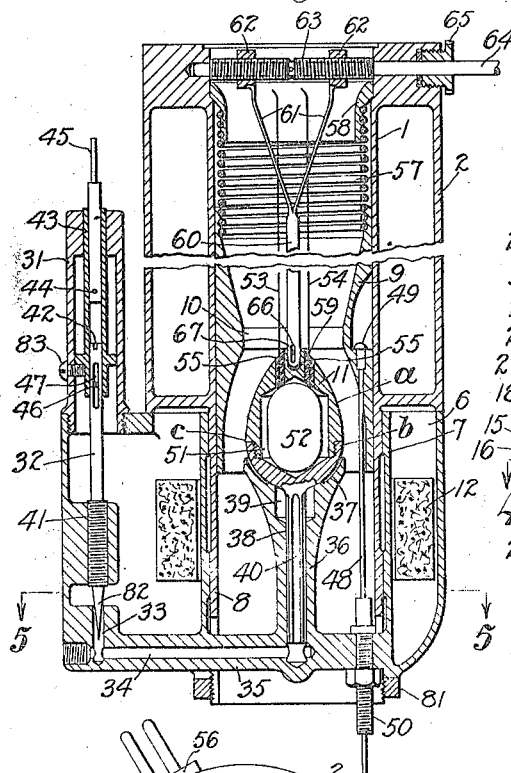
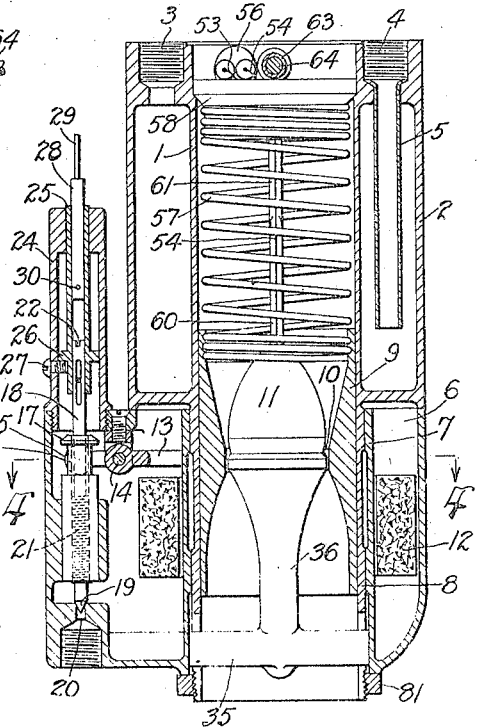
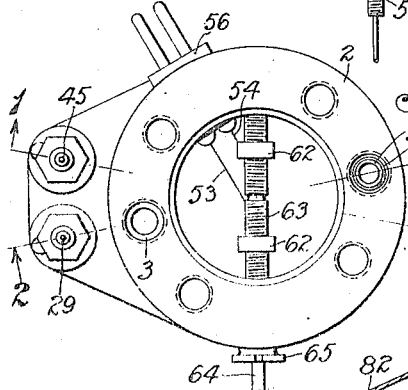
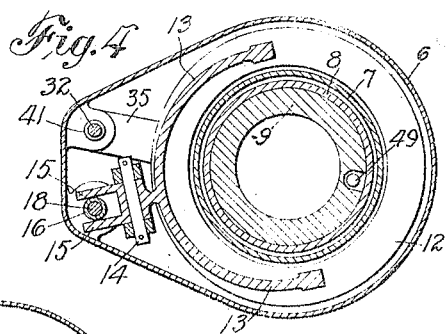
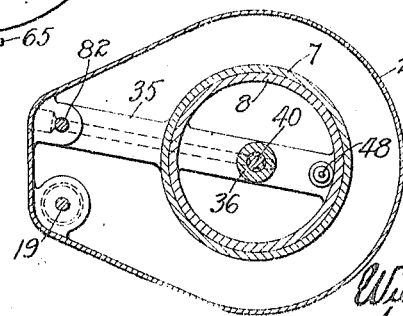

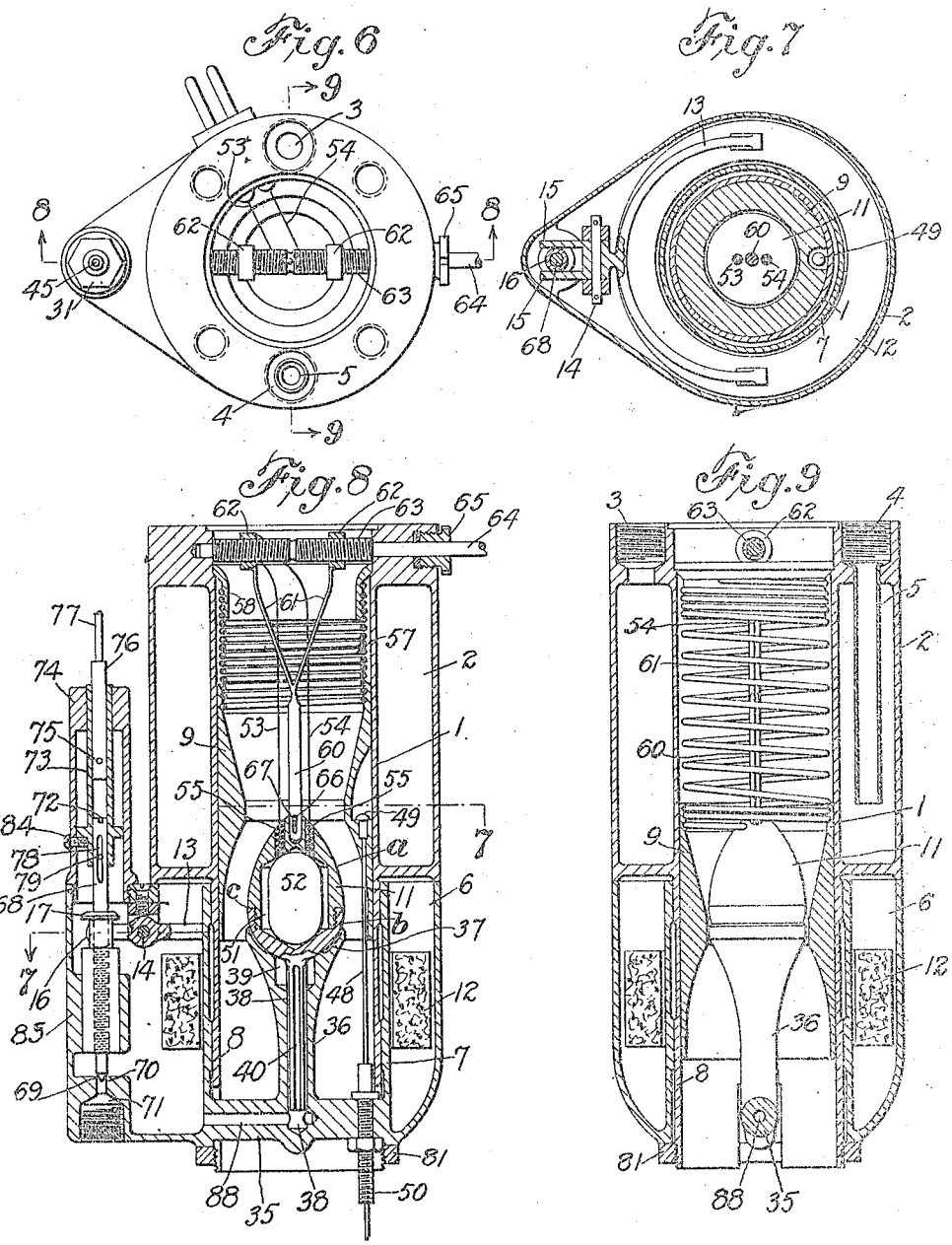

WILLIAM J. P. MOORE, OF NEW YORK, N. Y.

CARBURETER.

1,212,986.  Specification of Letters Patent.  Patented Jan. 16, 1917.

Application filed April 2, 1915. Serial No. 18,657.

*To all whom it may concern:*

Be it known that I, WILLIAM J. P. MOORE, a citizen of the United States, residing at New York, in the county of New York and State of New York, have invented certain new and useful Improvements in Carbureters, of which the following is a specification, reference being had therein to the accompanying drawing.
My invention consists in certain novel and useful improvements in carbureters.

The object is to produce a simpler, more complete and efficient device than has heretofore been possible, the same subserving the interest of economy in construction as well as in operation, in that there is a large saving of fuel and at the same time little wear upon the mechanical parts.

The invention comprises essentially a Venturi tube in combination with a central floating or ball-shaped valve which may be internally heated, if desired, together with other necessary structural features of a carbureting instrument whereby the proper degree of admixture for the air and gas, hydrocarbon oil, or hydrocarbon vapor is automatically varied and regulated in a satisfactory and successful manner, the valve preferably operating automatically within a comparatively small range of movement; and the invention further comprises various details and peculiarities in the construction, arrangement and combination of parts, substantially as will be hereinafter described and then more particularly pointed out in the claims.

In the accompanying drawing illustrating my invention: Figure 1 is a vertical section of my improved carbureter taken on the line 1, 1 of Fig. 3; Fig. 2 is a vertical section on a line at an angle to the section of Fig. 1, it being taken on the line 2, 2 of Fig. 3; Fig. 3 is a top plan view: Fig. 4 is a horizontal section on the line 4, 4 of Fig. 2; Fig. 5 is a horizontal section on the line 5, 5 of Fig. 1; Fig. 6 is a top plan view of a modified or different form of the invention, which form is illustrated in Figs. 8 and 9; Fig. 7 is a horizontal section on the line 7, 7 of Fig. 8; Fig. 8 is a vertical section on the line 8, 8 of Fig. 6; Fig. 9 is a vertical section of the same form taken on the line 9, 9 of Fig. 6 at an angle to the view of Fig. 8.

Similar characters of reference designate corresponding parts throughout the different figures of the drawing.

Referring first to the form of the invention delineated in Figs. 1, 2, 3, 4 and 5, it will be observed that 1 designates a casing adapted to contain several mechanical parts. When desired, it is provided with a water jacket 2, having a water inlet 3, and a water outlet 4, the latter furnished with an inwardly projecting pipe 5, which leads toward a point near the bottom end of the interior of the jacket so as to establish a more complete circulation of the water; though it must be understood that I am not to be confined by any means to the use of a water jacket, and may dispense with the same at any time. The casing 1 has a general cylindrical form. Contiguous thereto is an annular fuel chamber 6, whose inner cylindrical wall 7 fits over the extension 8 of the casing 1. There is an open passage through the center of the casing 1 and its extension 8, through which air enters the device. Casing 1 and its extension 8 contain a movable Venturi tube 9 which is contracted at 10 in diameter so that near the middle part of this tube 9 its diameter is reduced quite a little below the diameter at its ends, there being thus formed at the middle point of the Venturi tube a valve seat 10 for a floating valve 11, the function and operation of which I shall proceed later on to more fully and carefully describe.

In the chamber 6 is a circular float 12 of cork, or any other buoyant material, which floats in the gasolene or fuel supply in said chamber. Resting on the float 11 at opposite sides thereof are the arms of a forked lever 13 which is pivoted in the chamber 6 by a pivot 14, and beyond said pivot is provided with arms 15 for loosely engaging a sliding sleeve 16 provided with a head 17. The arms 15 lift sleeve 16 when the fuel level in chamber 6 drops and the float 12 likewise drops, so that there will also be lifted a valve stem 18 having at its lower end a valve 19 arranged in conjunction with a fuel inlet 20, so that gasolene or other liquid fuel may be admitted at this point into the fuel chamber as needed. The valve stem 18 has a screw-threaded portion 21 screwing through the slide 16 and thus adjustable relatively thereto so as to increase or diminish the distance that it moves toward and away from the inlet 20. The upper end of the valve stem 18 is notched at 22, so that a tool may be applied thereto for adjusting it when it is accessible, but as the end is situated oftentimes at an inaccessible point, as for instance within the tubular lateral casing 24 on the side of the fuel chamber 6, (see Fig. 2), it is convenient to use a tube 25 passing through the end of the casing 24 and receiving the upper end of the valve stem 18, being connected thereto by means of a pin passing through a slot in said stem. A rod 28 attached to a suitable device enters the upper end of the tube 25 and is pinned or otherwise fastened thereto at 30. Thus by rotating the rod 28, the valve stem 18 may be rotated and its pointed valve end 19 adjusted with relation to its seat 20, whereby I am enabled to regulate the level of the gasolene or other liquid fuel in the chamber 6, as desired, it being possible in this way to vary the level of the liquid in the chamber 6. Such level having been determined upon, the adjustment of the supply valve 19 can be made so that the forked lever 13 will rise normally with the float so as to close the valve 19 when the desired level in the float chamber is reached, it being noticed that when the supply is too large and the float rises in consequence, the result will be to oscillate the lever 13 on its pivot 14 and thus depress the slide 16 and shut the supply valve. In this way the float automatically determines the quantity of liquid fuel that is to be admitted at any particular time to the interior of the chamber. A set screw 27 in the wall of casing 24 limits the movement of the sleeve 25. It will be noticed that a collar 26 on the sleeve 25 strikes against the set-screw 27. In Fig. 1 a setscrew 83 has the same function with a collar on the tube 43 that the set-screw 27 has with the collar 26 in Fig. 2.

Alongside of the lateral casing 24 which contains the mechanism of the main supply valve 19, as I have just described, is a similar parallel lateral casing 31 (see Fig. 1) containing the mechanism relating to a needle valve which controls the passage of the liquid fuel to the mixing chamber where it is commingled with air to form the explosive mixture. 32 designates the stem of a needle valve whose pointed end 82 works in conjunction with a seat 33, from which a passage 34 leads through the wall of the lower part 35 of the main frame, which part is connected with the wall of the fuel chamber 6 and lies within the end of the extension 8 of the tubular part 1 of the main casing, there being a ring 81 screwed on the end of extension 8 against the wall of chamber 6 to hold the latter securely on the extension 8 and against the other parts of the main frame. The passage 35 enables the fuel to reach a point in the lower end of a central cup-shaped stand 36 rising upwardly from the cross-over connection 35 of the frame, which stand 36 has a cup-shaped recess 37 at its upper end to receive the floating valve 11; and it also has a vertical passage 38 running from the seat 37 and a recess 39 below seat 37 downwardly to the lower end of the stand 36, where it connects with the passage 35. Such passage 38 contains the stem 40 of the valve 11, which stem is arranged to fit loosely in the passage 38 and is provided with longitudinal grooves to enable the gasolene or other liquid fuel to more readily pass upwardly alongside the stem 40 and into the recess 39 and cup-shaped seat 37, from which it emerges into the space around the valve 11 where it is brought into contact with the air that is entering the device through the lower end of the tubular extension 8.

Returning now to the needle valve 82 for the purpose of more fully explaining its arrangement and operation, it is to be observed that the stem 32 is screw-threaded at 41 to engage a screw-threaded boss on the wall of the fuel chamber 6 so that in this way the needle valve may be adjustable with relation to its seat. Stem 32 is notched at its upper end at 42 for the application of an instrument whereby it can be rotated in the process of adjustment, but as this notched end when inside of the casing 31 is not easily accessible, I employ a tube 43 which is inserted through the upper end of the casing 31 and to which is pinned a rod 44 attached to a suitable device 45. The lower end of the tube 43 receives the notched upper end of the valve stem 32, and a pin 46 passes through said tube 43 and a slot 47 in the stem 32. Thus the wire 45 and the rod to which it is fastened can be actuated to revolve the tube 43 and thus revolve the valve stem 32 and adjust the valve 82. The pin 46 and slot 47 permit considerable relative motion between the parts; and a set screw 83 limits the downward movement of tube 43, because a collar on the tube 43 strikes against said set-screw 83.

The Venturi tube 9 is actuated by suitable connections with the steering wheel or other part of an automobile construction, for example, or with any other device for operating it, the connection in the present instance consisting of a Bowden rod or wire 48 fastened to the tube 9 by means of a headed pin 49, and passing through the screw-threaded guide 50 that is supported on the cross-over connection 35 at the lower end of the central stand 36.

Referring to the float valve 11, it will be noted that it rests loosely on the seat 37 at the top of the stand 36 and is capable of rising and falling in position so as to close down tightly upon the seat 37 or be lifted a greater or less amount therefrom, an operation which takes place by suction during the action of the apparatus, but the vertical play of this valve 11 is usually slight and is controlled by devices which I will presently describe. The valve 11 may vary considerably in shape moreover, being sometimes a ball, but preferably a pointed sphere, or egg-shape, the point being upward like a reversed plumb-bob; also this valve is preferably made in two parts which are hollow, one of them, as $a$, having a screw-threaded flange $c$ which screws into the other half $b$ so that when the two parts are screwed together, there is provided an interior chamber 51 which is ordinarily occupied by an electric pile or heater 52 having conducting wires 53 and 54 running thereto and entering through the wall of the valve 11 at the insulated parts 55, said wires 53 and 54 passing up in the casing 1 and through the wall of the latter at some suitable point, as for example, at the plug 56. It is evident, however, that the construction of the valve and the heating device therewith may vary widely and may partake of a great variety of different forms, and the heating may be accomplished either by the use of electric conductors, as shown and described, or by some other suitable means. The heater within the valve 11 heats it to any desired temperature and thus assists in the vaporization of the fuel.

In the upper part of the casing 1 is a coiled spring 57, which at one end engages the upper end of the Venturi tube 9, and at the other end engages a ring 58 which is inserted in the casing 1 in a manner to lock the end of spring 57. A few of the coils of the spring 57 are held by the ring 58, between it and the wall of the casing 1, so as to make a right connection at one end of the spring; while a few of the coils of the other end are introduced into grooves on the inside upper end of the Venturi tube 9 so as to make a tight connection there. In this way the spring 57 is enabled to perform the function of restoring the Venturi tube 9 to any position from which it may be removed from time to time through the action of the Bowden wire 58, or other connection by which it is adjusted from time to time for the purpose of controlling the size of the passage between the seat 10 and the valve 11 during the admission of the proper amount of air and gas into the mixing chamber wherein the air and fuel, or fuel vapor, is thoroughly mixed and converted into an explosive gas.

The upper end of the valve 11 is recessed at 59 to receive the lower end of a rod 60. This rod is forked into the two spring fingers 61 whose ends are furnished with nuts 62 that are engaged by the right and left hand screw 63 supported in the upper end of the casing 1, the right hand section of said screw engaging one of the nuts 62 and the left hand section engaging the other nut 62, so that when the screw is rotated, the effect of such rotation will be to draw the spring fingers 61 together or force them farther apart, and thus change the position of the rod 60, up or down, thrusting it farther into the recess 59 or withdrawing it therefrom, accordingly as said rod is lengthened or shortened, or depressed or raised, in consequence of the movement of the spring fingers 61. Right and left hand screw 63 is formed with a shaft 64, which projects through a packing gland 65 in the wall of the casing 1, and said rod 64 is suitably connected with the steering wheel or other part of the controlling mechanism of the car, or other machine, so that it may be operated as desired. The effect of thus changing the position of the rod 60 with respect to the valve 11 permits said valve to have greater or less play on its seat 37 and limits the amount of such play as much as may be desired, for when the rod 60 is thrust nearly to the bottom of the recess 59, the valve 11 can only lift a trifle from its seat 37, and, hence, only a very small amount of fuel will be introduced into the mixing chamber, while at other times when the rod 60 is lifted for a greater distance through the mediation of the connecting leverage, this ball valve 11 will have a wider movement and will rise from its seat sufficiently to allow a larger amount of fuel to pass. In the lower end of the rod 60 is a slot 66 through which passes a pin 67 held in the upper pointed end of the valve 11. The slot and pin are so related that during the ordinary fluctuations in the position of the valve 11 this pin will not come in contact with the end of the slot, but, if desired, when the spring fingers are actuated for the purpose, the lifting of the rod 60 sufficiently far will in consequence of the pin connection lift the ball valve 11 also.

Thus far, I have been describing the parts as they are arranged in Figs. 1 to 5. Passing now to Figs. 6 to 9, it will be observed that so far as the casing 1, water jacket 2, Venturi tube 3, ball valve 11, and numerous appurtenant and coöperating parts are concerned, the structure and relative arrangement are the same as in the other figures, the sectional views in Figs. 8 and 9 corresponding closely in the great majority of their mechanical features with what is shown in Figs. 1 and 2, but the invention appears in a modified form which dispenses entirely with the needle valve 82 and the means for operating it, so that instead of having a separate supply valve like the valve 19 operated by a float in the fuel chamber and a separate needle valve like valve 82 operated by proper devices on the steering wheel, or otherwise, I employ simply one float-controlled valve operated for purposes of adjustment from the steering wheel or otherwise, as the case may be, and having the usual function of automatically admitting liquid fuel from a tank or source of supply into a fuel chamber wherein is a float and a lever for connecting the float with the valve stem, there being a direct passage from the interior of the fuel chamber to the ball valve which allows the outflow of the fuel into the mixing chamber, and there being thus no needle valve between the fuel chamber and the mixing chamber, and no valve at all there, the parts being thus greatly simplified in their construction and arrangement without any diminution in the advantages gained in the operation.

In Figs. 6 to 9, assuming that the parts are in general the same with the omission of the needle valve devices, I will proceed to describe how the supply valve is arranged and how the fuel passages are placed for allowing exit of the fuel from the fuel chamber to the mixing chamber.

68 denotes a valve stem having at its end a supply valve 69 working on a seat 70 in a passage 71, to which is connected any suitable supply pipe leading from a tank or other source of supply so that gasolene or other liquid fuel is allowed to pass by the valve 69 into the fuel chamber 6 wherein is a float 12 which operates a lever 13 pivoted at 14, and whose arms 15 connect loosely with a sleeve 16, on which is a head 17 against which the lever acts in opening the valve 69 when the level of the gasolene in chamber 6 falls low enough to cause the float to act for this purpose. The sleeve 16 is internally screw-threaded so as to be engaged by the screw-threaded portion of the valve stem 68. Sleeve 16 slides easily up and down in the boss or guide 85 on the wall of chamber 6. The upper end of the stem 68 is notched at 72 for the application of a screw driver or other tool when desired, and this end of the valve stem is received into the sleeve 73 held centrally within the single lateral casing 74 on the side of the main casing, there being, therefore, in this example of the invention only one of these casings 74 instead of the two casings 31 and 24, as in the form of the invention in Figs. 1 to 6; simplicity, cheapness, and convenience being thereby subserved in this simpler form. The sleeve 73 is attached by means of a pin 75 to the rod 76 having fastened thereto the operating wire 77 or some equivalent device. It is further to be noted that the valve stem 68 is slotted at 78 and engaged by a pin 79 passing through the wall of sleeve 73 and the slot 78, so that the stem 68 has ample vertical play within the sleeve 73 during the various adjustments of the valve 69, and this pin and slot connection between the valve stem and the sleeve 73 allows the valve stem and its valve to be lifted when desired by means of the rod 76 and wire 77. A set screw 84 in the wall of casing 74 limits the inner movement of the sleeve 73. The gasolene or other liquid fuel is therefore introduced as stated through the passage 71 by the valve 69 into the chamber 6, accordingly as the float 12 opens and closes the valve 69. In the crossover connection 35, at the lower end of the wall 7, which surrounds the lower extension 8 of the main tubular casing 1, is a passage 88 leading directly from the interior of the fuel chamber 6 to the vertical passage 38 in the stand 36, in which passage 38 is the grooved stem 40 projecting below the floating valve 11. Thus it will be seen that the gasolene or other liquid passes directly from the fuel chamber to the valve 11 through suitable passages as indicated without the use of any controlling valve, that is to say, without the use in this form of the invention of any needle valve like the valve 82 in the form of the invention shown in Figs. 1 and 2. Therefore, the invention is very much simplified in this modified form, while at the same time excellent results in practice are attained.

Obviously many changes may be made in the construction and arrangement of the various parts of the invention without exceeding the scope thereof as defined in the claims appended hereto.

Having thus described my invention, what I claim as new and desire to secure by Letters Patent, is:

1. In a carbureter, the combination of a main casing, a valve seat movable therein, means for moving said valve seat, a ring inserted in the casing, a resilient connection attached to the ring and also to the seat, and acting to return the seat after it has been moved by the aforesaid means, a float valve arranged movably with relation to the valve seat, a fuel chamber, a float therein, means for admitting fuel to said chamber, and a needle valve for allowing the fuel to pass from the fuel chamber into the mixing chamber.

2. In a carbureter, the combination of a main casing, a valve seat reciprocable therein, means for moving it, a ring inserted in the casing, resilient means attached to the ring and to the seat for the purpose of returning the seat after its movement, a valve having a limited floating movement with relation to the seat, a fuel chamber, a float therein, means for admitting fuel to the chamber, and a needle valve for allowing the fuel to pass from the chamber into the mixing chamber.

3. In a carbureter, the combination of a main casing, a valve seat consisting of a Venturi tube movable therein, a floating valve within the Venturi tube, a yielding connection between the tube and the casing for urging the seat away from the valve to provide a wider opening, a ring within the casing to which the yielding connection is attached, means for moving the tube nearer the valve to contract the opening, a fuel chamber, a float within said chamber, means for admitting fuel to the chamber, a needle valve for allowing the fuel to pass from the chamber into the mixing chamber.

4. In a carbureter, the combination of a main casing, a Venturi tube movable therein, a floating valve within the Venturi tube, means for moving said Venturi tube, a ring within the casing, resilient means attached to the said ring and to the Venturi tube for the purpose of returning said Venturi tube after it is moved by the aforesaid means, a fuel chamber, a float therein, a valve for admitting fuel to the chamber, a needle valve for allowing the fuel to pass from the chamber into the mixing chamber, and means for operating the valves.

5. In a carbureter, the combination of a main casing, a Venturi tube movable therein, a floating valve within the Venturi tube, means for moving said Venturi tube so as to contract the opening between it and the valve, resilient means for returning it after such movement, means inserted in the casing to which means said resilient means is attached by a few of its coils, a fuel chamber, a float therein, and a valve operated by the float for admitting fuel to said chamber, together with means for allowing the fuel to pass from said chamber to the mixing chamber.

6. In a carbureter, the combination of a main casing, a Venturi tube movable therein, a ring inserted in the casing, a spring connection between said tube and the said ring in the casing, a floating valve within the tube, said valve having a stem, a seat for said valve having a fuel passage connecting therewith, said passage receiving the valve stem, a fuel chamber, a float therein, a supply valve for the fuel chamber operated by said float, and means for connecting the interior of the fuel chamber with the fuel passage leading to the seat of the floating valve.

7. In a carbureter, the combination of a main casing, a Venturi tube therein having a central portion of reduced diameter, a ring in said casing, a spring having its coils attached to said ring at one end, and at the other end to the Venturi tube, a fuel chamber annular in form and admitting air from the center, a float in said chamber, an inlet valve controlled by the float, a floating valve within the Venturi tube and having a stationary seat, said floating valve having a stem, means for admitting fuel to the fuel chamber, and a needle valve for admitting fuel from said chamber to the mixing chamber within the Venturi tube.

8. In a carbureter, the combination of a main casing, a fuel chamber of annular form surrounding a central passage, a Venturi tube in said passage, means for operating the Venturi tube in one direction, resilient means for returning it in the other direction, means inserted in the main casing to which a few of the coils at one end of the resilient means are attached while the other end of said resilient means is attached to the Venturi tube, an automatic floating ball valve within the Venturi tube, said valve being provided with a stem, a seat for said valve, and means for admitting fuel to the interior of the Venturi tube past the floating valve.

9. In a carbureter, the combination with a casing, a Venturi tube therein which receives the mixture of air and gas, means for operating the Venturi tube in one direction, resilient means for returning it in the opposite direction, a floating valve within the Venturi tube, controlling the fuel outlet, said valve being provided with a stem and being automatically operated, an annular fuel chamber, a float therein, a valve for admitting fuel to said chamber, which valve is controlled by the float, a needle valve for admitting fuel from the fuel chamber to the mixing chamber, and means for limiting the automatic movement of the floating valve.

10. In a carbureter, the combination of a casing, a Venturi tube movable therein, a resilient connection between said tube and the interior of the casing, a floating valve within the tube, said valve having a stem, a seat for said valve having a fuel passage connecting therewith and receiving the valve stem, means for limiting the automatic movement of said floating valve, a fuel chamber of annular form surrounding the air inlet, a supply valve for said fuel chamber automatically operated by a float in the chamber, a needle valve for admitting fuel from the fuel chamber to the mixing chamber, and means for operating the needle valve.

11. In a carbureter, the combination of a main casing, a Venturi tube therein, a floating valve within the Venturi tube, a member engaging the end of said valve for limiting its movement, said member having forked arms, means for drawing said arms together or forcing them apart so as to affect the position of the member, a fuel chamber, a supply valve therefor operated by a float within the chamber, and means for allowing fuel to pass from the fuel chamber to the mixing chamber within the Venturi tube.

12. In a carbureter, the combination of a casing, a Venturi tube therein, a floating valve within the Venturi tube, means for limiting the movement of said valve consisting of a positive stop, said stop having forked arms, means for drawing said arms together or forcing them apart so as to affect the position of the stop, an annular fuel chamber, a supply valve therefor operated by a float within the chamber, and a needle valve for controlling the passage of fuel from the fuel chamber to the floating valve.

13. In a carbureter, the combination of a casing, a Venturi tube therein, a floating valve within the Venturi tube, a positive stop for the valve on one side thereof, means for changing the position of said stop consisting of a screw device engaging the forked arms of the stop, a stationary seat below said floating valve, an annular fuel chamber surrounding the inlet for the air to the mixing chamber, a supply valve for said chamber controlled by a float within the latter, and means for allowing fuel to pass from the chamber to the floating valve.

14. In a carbureter, the combination of a main casing, a Venturi tube movable therein, means for operating said tube, a floating valve within the tube, means for limiting the movement of said valve consisting of a rod engaging the same, means for adjusting the position of the rod, an annular fuel chamber, a supply valve therefor automatically operated by a float within the chamber, a needle valve for controlling the passage of fuel from the fuel chamber to the mixing chamber within the Venturi tube.

15. In a carbureter, the combination of a main casing, a Venturi tube movable therein, a floating valve within the tube, means for operating the tube, resilient means for returning it, an annular fuel chamber surrounding the air inlet, a seat for the floating valve having an inlet passage leading from the fuel chamber, means for limiting the movement of the floating valve consisting of a rod engaging it, means for adjusting said rod vertically with reference to the valve, and a supply valve for the fuel chamber automatically operated by a float within the latter.

16. In a carbureter, the combination of a main casing, a Venturi tube movable therein, a floating valve within the tube, means for operating the tube, resilient means for returning it, an annular fuel chamber surrounding the air inlet, a seat for said floating valve having an inlet passage from the fuel chamber, means for limiting the movement of the floating valve consisting of a rod engaging it, means for adjusting said rod vertically with reference to the valve consisting of a screw device and members traveling thereon and connected with said vertically-movable rod, and an automatic supply valve for the fuel chamber.

17. In a carbureter, the combination of a main casing, a Venturi tube movable therein, a floating valve within the tube, means for operating the tube, a seat for said floating valve having an inlet passage for the fuel, means for limiting the movement of said valve consisting of a rod engaging it, and means for adjusting said rod vertically with reference to the valve consisting of a screw device and members thereon traveling toward and away from each other and connected with said vertically-movable rod.

18. In a carbureter, the combination of a main casing, a Venturi tube movable therein, a floating valve within the tube, means for operating the tube, a seat for said floating valve having an inlet passage for the fuel, means for limiting the movement of said valve consisting of a rod engaging the valve, means for adjusting said rod vertically with reference to the valve, said vertically-movable rod having spring arms provided with nuts and a right and left hand screw on which said nuts travel in one direction or the other for the purpose of raising or lowering said rod.

19. In a carbureter, the combination of a main casing, a Venturi tube movable therein, means for moving the tube in one direction, resilient means for withdrawing it in the other direction, a floating valve, a stationary seat therefor having a fuel inlet, means opposite to the seat and engaging the valve so as to limit its play, said means comprising a vertically-movable member having elastic arms and a right and left hand screw for actuating said arms so as to cause the member to be lifted or depressed.

20. In a carbureter, the combination of a main casing, a Venturi tube movable therein, means for moving said tube in one direction, resilient means for withdrawing it in the other direction, a floating valve within the Venturi tube, a stationary seat therefor having a fuel inlet, means for heating the interior of the floating valve, a vertically-movable rod entering a recess in the floating valve and adjustable relatively thereto so as to limit the play of the valve, said rod dividing into two branching arms carrying nuts, and a right and left hand screw on which said nuts travel toward and away from each other.

In testimony whereof I affix my signature.

WILLIAM J. P. MOORE.